March 14, 1950
T. B. MARTIN ET AL
PITCH SHIFTABLE PROPELLER BLADE
AND TORQUE UNIT THEREFOR
2,500,692
Filed Oct. 7, 1944
2 Sheets-Sheet 2
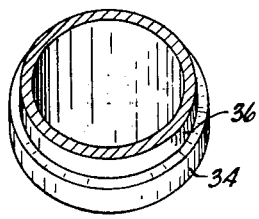
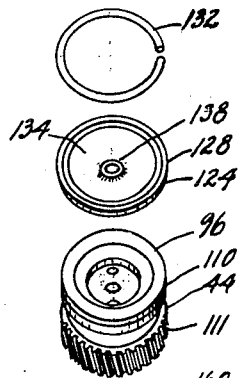
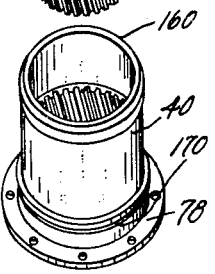
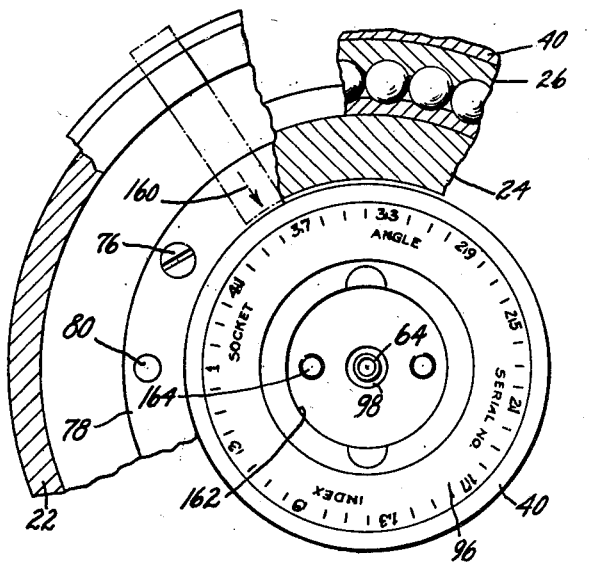
Fig. 4
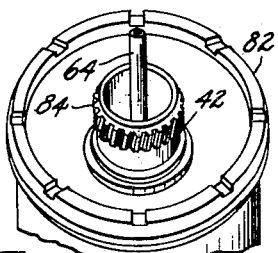
Fig. 3
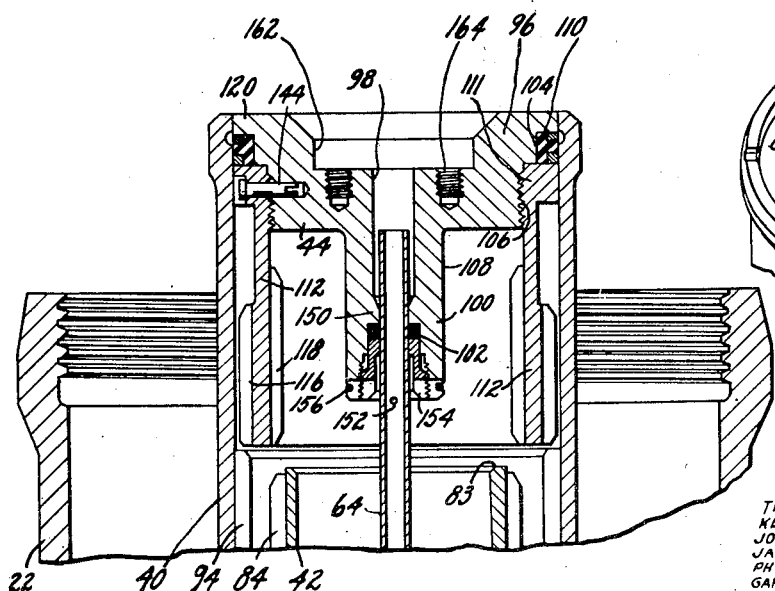
Fig. 2
INVENTORS
THOMAS B. MARTIN
KENNETH L. BERNINGER
JOHN F. HAINES
JAMES R. MAY
PHILLIP E. THEOBALD
GARTHWOOD R. TAYLOR &
GENE T. NEUDECK
BY *Spencer, Hardman & Fehr*
*their* ATTORNEYS Patented Mar. 14, 1950

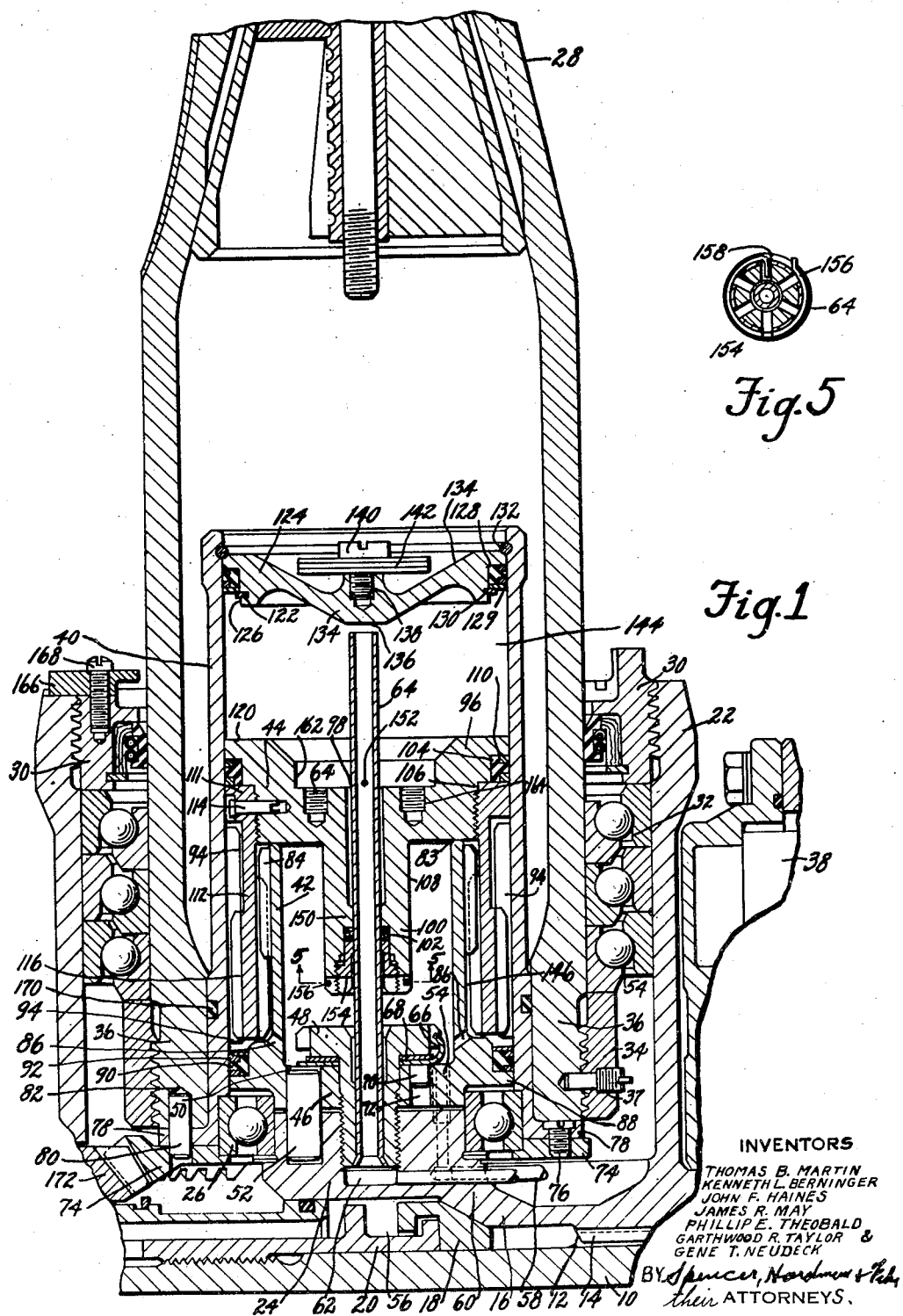

2,500,692

UNITED STATES PATENT OFFICE 2,500,692

PITCH SHIFTABLE PROPELLER BLADE AND TORQUE UNIT THEREFOR

Thomas B. Martin, Kenneth L. Berninger, John F. Haines, James R. May, Phillip E. Theobald, Garthwood R. Taylor, and Gene T. Neudeck, Dayton, Ohio, assignors to General Motors Corporation, Detroit, Mich., a corporation of Delaware Application October 7, 1944, Serial No. 557,640

6 Claims. (Cl. 170—160.33)

1

This invention relates to torque units for shifting the pitch of blades in aircraft propellers, and blade mountings enclosing the same.

An object of the invention is to provide a blade mounting and enclosed torque unit that will give ready access for service and replacement without tearing down the whole propeller mechanism.

Another object of the invention is to provide a separable blade mounting that will give ready access to an enclosed torque unit for service and repair.

Another object of the invention is to provide a blade mounting and torque unit for shifting the pitch of the blade that can be serviced in the field.

Another object of the invention is to provide a torque unit for a propeller unit that can be assembled from the out end of a blade socket, and serviced with a minimum of tear down of associated structure.

Another object is to make a torque cylinder without threaded connections and with a removable head so that internal splines may be broached for part of its length.

Still another object is to provide a torque unit having the maximum piston area possible and still fit into blade root.

Further objects and advantages of the present invention will be apparent from the following description, reference being had to the accompanying drawings, wherein a preferred embodiment of the present invention is clearly shown.

In the drawings:

Fig. 1 is a longitudinal sectional view of a blade mounting and enclosed torque unit secured to a hub and shaft, and shown fragmentarily.

Fig. 2 is a view on a similar scale, but showing certain parts moved to a new position illustrating the means for servicing, indexing and assembly.

Fig. 3 is an exploded view of the torque unit illustrating the order of assembly with respect to a hub socket.

Fig. 4 is a transverse sectional view through the blade mounting, illustrating certain features of the indexing provisions, it being a view substantially as shown by the line and arrows 4—4—4 of Fig. 2.

Fig. 5 is a sectional view through the transfer tube seal substantially as indicated by line and arrows 5—5 of Fig. 1.

Referring particularly to the drawings, 10 refers to an engine driven shaft having splines 12 interleaving with splines 14 within the bore of a hub 16, by which the propeller is driven. Suitable cones, one of which is shown at 18, operate to secure the hub on the shaft where retention is perfected by the usual nut 20. The hub 16 provides a plurality of blade sockets 22 concentric with each of which there is a circular boss 24 centering a preloaded bearing 26 for each of the blades 28. A nut 30 threaded into the end of the socket 22 receives the thrust of a stack of bearings 32, that are engaged by a blade nut 34 locked on the root end 36 of the blade by a stud 37. The root portion of the blade encloses the torque unit by which it is shifted in pitch in response to the control of a governor mechanism 38 mounted on and rotatable with the propeller hub.

The torque unit mounted within the blade socket includes a cylinder 40, a fixed spline 42, and a piston 44 having splined engagement with both the cylinder and fixed spline, as will presently appear. The fixed spline 42 is a cup like member whose bottom wall 46 is apertured to receive a bolt 48 threaded into the hub boss 24 for securing the spline in place. Other apertures 50 are receptive of dowels 52 by which the spline is oriented with respect to the hub, and one of the dowels is tubular as suggested by dotted lines and reference numeral 54, for opening from the interior of the fixed spline to a chamber 56 in the hub boss, and branching by pipe 58 to the control apparatus of the regulator. A similar pipe 60 leads from the regulator to a chamber 62 central of the boss 24 where it communicates with a tube 64 carried by the bolt 48 and extending substantially the length of the cylinder 40. When the fixed spline 42 is secured rigidly in place by the bolt 48, the latter is locked in place by the tongue 66 of a lock plate 68 secured to a pin 70 lodged in a drillway 72 of the hub boss 24, then the spline engages within the inner race of the preloaded bearing 26 and seats it firmly in place about the hub boss 24. The outer race of the preloaded bearing 26 is seated in a recess of a blade gear 74 secured by screw devices 76 to a peripheral flange 78 at the lower end of the cylinder 40. The angular relation of the blade gear 74 and the cylinder 40 is secured by one or more dowels or locators 80 aligned with holes in the blade gear 74 and flange 78 and projecting above the latter to mate with similarly located drillways 82 in the end of the blade root 36.

The fixed spline 42 is further characterized by the side wall thereof being substantially cylindrical and extending substantially half the length of the cylinder 40 where it ends at 83 to provide an in-stop for the piston 44. The outer surface of the spline member is provided with a succession of spline teeth 84 of a steep pitch, and the portion of the side wall near the juncture with the bottom wall is apertured at 86 to provide communication between the interior and exterior of the fixed spline. A flange 88 exterior thereof and in the general plane of the bottom wall 46 engages the inner surface of the cylinder 40, there being a ledge for reception of a fluid seal 90 loosely covered by a ring 92. This seal prevents leakage of the pressure exerting medium at the rotary joint between the flange 88 of the spline member and the cylinder, and the ring 92 prevents the extrusion of the seal from the ledge into the space between the side wall of the spline member and the cylinder when the preloaded bearing is lubricated. In doing so, the ring may engage the lower end of a series of internal splines 94 located within and at the lower end of the cylinder 40.

The piston 44 comprises a head member 96 of a diameter to slide within the cylinder 40 and is centrally apertured at 98 to slidably engage the tube 64, a central boss 100 extending toward the hub boss 24 to house a packing gland 102 slidable along the tube 64. The head 96 is successively reduced in diameter or stepped at 104, 106 and 108, the latter of which provides the central boss 100. The step 104 provides a seat for reception of a fluid seal 110, and the step 106 is threaded to receive the interiorly threaded end 111 of a skirt member 112 which tends to confine the seal 110, the parts 96 and 112 being locked against relative rotation by the cross pin 114. The seal 110 is in the nature of a piston ring and maintains the juncture of the cylinder 40 and the head member 96 proof against fluid leakage when a pressure differential occurs between the two sides of the head member. The skirt member 112 provides a series of spline teeth 116 adapted to mate with the spline teeth 94 inside of the cylinder 40, and a second series of spline teeth 118 adapted to mate with the spline teeth 84 of the fixed spline member 42. The cooperating spline teeth 84 and 118, between the spline member and skirt are on an opposite inclination from the cooperating spline teeth 116 and 94, between the skirt and the cylinder, so that lineal movement of piston and its skirt with respect to the fixed spline member will accelerate or multiply the rotary movement of the cylinder. The movement of the piston while lineal of the fixed spline member 42 and tube 64, also has a rotary component due to the inclination of the spline teeth 84, 118 which it must follow. That movement of the piston transmitted to the cylinder results only in rotary movement of the cylinder about the preloaded bearing, because the clamping engagement of the bearing 26 between the hub boss and fixed spline on the one hand, and between the blade gear and cylinder flange on the other hand, prevents any lineal movement of the blade cylinder. Outward movement of the piston and its skirt is arrested by the outer surface 120 of the head member 96 engaging a ridge 122 on the inside surface of a cylinder closing head 124, before any disengagement of the mating spline teeth can occur. The periphery of the cylinder head 124 is reduced in diameter at 126 to receive a fluid seal 128 which is held in confined relation by a flat ring 129 and a spring or snap ring 130. The assembled cylinder head being inserted in the out end of the cylinder 40, it is retained against dislodgment by means of a spring ring 132 seated in a groove inside of the open end of the cylinder. The central portion of the cylinder head is dished inward at 134 to approach the end of the tube 64, but is spaced therefrom as indicated at 136 so as not to interfere with fluid flow to and from the end of the tube. The dished portion is drilled and threaded at 138 to receive a bolt, rod, or other tool, by which assembly and disassembly of the head within the piston can more easily be accomplished. This tapped drillway also provides for retention of a balance assembly consisting of a stud 140 and the necessary number of balance shims 142.

The torque unit so characterized provides a complete unit that is capable of assembly with the hub 16 before any part of the blade surrounding it is added, and provides a structure in which an open ended cylinder with a closure member provides two pressure chambers 144 and 146 located on opposite sides of, and separated by, the piston head member 96, and both having a single fluid circuit connection with the governor or control mechanism 38. The chamber 144 is of maximum content as shown in Fig. 1, and has its fluid connection with the regulator through the end of the tube 64 into the chamber 62 and thence along the tube 60, while the chamber 146 is of minimum content as shown in the same Fig. 1, and has its fluid connection with the regulator through the tubular dowel 54, the chamber 56 and thence the tube 58. Fluid pressure applied to one or another of the chambers through either of the tubes 58 or 60, moves the piston assembly and results in a drain of the other chamber through the other of the tubes 58 or 60. The friction against movement of the piston assembly is reduced by minimizing the bearing engagement between the piston and the tube 64, and the cylinder 40, and by limiting the actual engagement so far as possible to a mere ring of contact. As shown, the contacting of the piston head and cylinder is limited to the region of the fluid seal 110, while the contacting of the central boss 100 and the tube 64 is axially displaced inward of the head, and comprises an internal flange 150 bored to fit the tube 64 adjacent the gland 102, the out end portion of the central passage 98 relieving the engagement and providing for escape of fluid medium through a bleed aperture 152 in the tube 64, and opening into the chamber 144 for all but the collapsed condition thereof. Toward the same end, the gland 102 comprises a leather washer set in an axial recess of the boss 100 where it is firmly seated by a castellated nut 154 held in adjusted position by a spring ring 156 reposing in a peripheral groove on the exterior of the boss and having an arm 158 extending into radially aligned castellations of the nut 154 and the end of the boss. The apertures 86 in the fixed spline 42 form bleeds from the chamber 146 to the annular space between the spline and the cylinder occupied by the skirt 112 of the piston. When pressure is applied to the chamber 146 it also is effective through the apertures 86 against the ends of the skirt and other portions of the head member 96 to provide a pressure area equal to that of the chamber 144.

Installation of the torque unit is designed to take place before any part of the blade mounting is effected, as indicated by Fig. 3, and is accomplished by placing the blade gear 74 and preloaded bearing 26 in the socket 22 over the hub boss 24. Then the fixed spindle is placed in position and located by the dowels 52 to be there held by the bolt and tube assembly 48, 64. The fluid seal 90 being in place then the cylinder 40 is disposed over the spindle and passed to position over the outer race of the preloaded bearing 26 and aligned with the dowel pins 80 to be secured in place by the screw devices 76. That leaves the open end of the cylinder 40 exposing the fixed spline 42 and the tube 64 for reception of the piston assembly. The parts are so designed that the piston assembly may be inserted in the end of the cylinder so that the end of the cylinder and the end of the piston are flush as shown in Fig. 2, without yet engaging any of the cooperating spline teeth. At the same time, the boss 100 will have passed over the end of the tube 64. With the parts in this relation as illustrated in Figs. 2 and 4, the indexing of the piston skirt with the fixed spline, and with the cylinder, is easily effected. The edge of the cylinder is provided with an index line 160 marking the location of one of the spline teeth 94, and the spline teeth 116 of the piston skirt are numbered as shown in Fig. 4, while the piston may also be marked with indications of the minimum blade angle and the number of the tooth to be aligned with the index line 160, in accomplishing the blade setting. To assist in accomplishing the setting, the piston head 96 is centrally recessed at 162 and provided with threaded drills 164 for the reception of studs of a tool by which the piston is inserted and withdrawn with respect to the cylinder. The tool also facilitates rotating the piston within the cylinder while they are in the flush relation, so that the proper tooth of the piston can be mated with the proper groove of the cylinder. When that is accomplished the piston is pushed inward of the cylinder a short distance, or until the spline teeth 116 of the piston skirt just enter the grooves between the spline teeth 94 of the cylinder. At this point, there should be no engagement of the spline teeth 84 and 118, so that the cylinder and its piston are capable of unlimited rotation about the hub boss 24. The index line 160 of the cylinder is then brought to a certain relation with respect to a reference line 161 on the socket 22, or other fixed part, at which time the piston is pushed inwardly to engage the spline teeth 84 with 118. That procedure establishes the designed minimum blade setting and can be checked by jigs when the piston is pushed all the way in until it engages on the stop 83. Insertion of the cylinder head 124, and positioning of the ring 132, makes the hub and torque unit receivable for the blade 28.

A conventional blade with a hollow root is then passed over the torque unit and inserted within the socket so that the locating drillway 82 receives the locating dowel 80, and which establishes the pitch setting of the blade. The blade seating upon the flange 78 of the cylinder, the bearing stack 32 and retaining nut 30 are moved to place and locked by a clip or plate 166 and screw device 168. A seal ring 170 may be assembled between the cylinder 40 and the root of the blade, and a coordinating or master gear 172 may be journalled about the shaft 10, or equivalent part, to mesh with each of the blade gears 74, and make the pitch of one blade track with each of the others.

When the blade and root portion are removed as suggested by Fig. 2, then the cylinder head 124 can be removed for repair, servicing or replacement of the parts, or the indexing of the blade can be changed, all from the open end of the socket 22. Thus, there is no need to disturb any but the minimum of associated structure.

While the embodiment of the present invention as herein disclosed, constitutes a preferred form, it is to be understood that other forms might be adopted, all coming within the scope of the claims which follow.

What is claimed is as follows:

1. In a torque unit for effecting rotation of a blade part relative to a socket, having a hollow fixed spindle secured in the bottom of the socket and having exterior helical spline teeth, with a cylinder sleeve secured in driving relation to the blade part and journaled about the said spindle, said sleeve having interior helical spline teeth, the combination comprising, a removable cylinder head and sealing means for closing the end of the sleeve, a piston assembly insertable within the sleeve when the head is removed, said piston assembly including a skirt having interior and exterior sets of helical spline teeth adapted to mate with the spline teeth on the spindle and the sleeve respectively.

2. The combination set forth in claim 1 wherein means provide that the piston assembly may be inserted within the cylindrical sleeve flush with the end of the sleeve without engagement of any of the cooperating splines, whereby the rotatable part may be set at a desired angle relative to the socket before the assembly is completed.

3. The combination set forth in claim 1 wherein means provide that the piston assembly in moving lengthwise of the sleeve engages the end of the hollow spindle and the inside surface of the cylinder head as stops, and wherein fluid passages entering through the bottom of the spindle apply fluid pressure and drain to opposite sides of the piston.

4. In an hydraulically operated torque unit mounted in a blade socket, the combination comprising a cup-like spindle located centrally of the socket and having exterior spline teeth, means locking the spindle to the blade socket and providing a tube extending out of the socket, a cylinder sleeve journalled about the spindle and providing internal spline teeth surrounding but spaced from the spline teeth of the spindle, a piston slidably engaging within the cylinder sleeve and over the tube to separate the sleeve into a pair of opposed chambers, a skirt extending from one face of the piston and disposed in the space between the spindle and cylinder, said skirt having interior and exterior spline teeth cooperating with the spline teeth of the spindle and the cylinder to effect rotation of the cylinder upon movement of the piston along the cylinder, and means whereby said skirt and splines being of such length that the piston may be withdrawn from the splined engagement with the cylinder and spindle to a position flush with the end of the cylinder and then rotated relative to either spindle or cylinder without removing from the cylinder, a cylinder head member removably secured within the end of the sleeve for closing the cylinder, said cylinder head providing an abutment to prevent disengagement of the piston splines from either of the spindle or cylinder splines, and fluid passages in the hub opening through the spindle mounting for applying fluid under pressure selectively to the chamber on either side of the piston.

5. In a torque unit for rotating a blade in a socket, a fluid pressure actuated unit comprising a cylindrical sleeve journalled at one end concentric with the socket, a cup-like spline having a flange in bearing engagement with the bearing end of the sleeve, means for securing the spline rigidly in place, a tube mounted in the securing means and extending axially of and nearly the full length of the cylindrical sleeve, fluid passages opening through the spline, one of which openings leads to the said tube, spline teeth on the exterior of the cup-like spline member, and spline teeth of opposite inclination on the interior of the cylindrical sleeve, a piston assembly slidable over the tube and within the cylindrical sleeve and having a cylindrical skirt normally disposed between the cup-like spline and the cylindrical sleeve, said skirt having spline teeth interior thereof cooperable with the spline teeth of the spindle, and spline teeth exterior thereof cooperable with the spline teeth of the cylinder, the spline teeth of the cup-like spline and the cylinder being restricted to the radially inward end half of the cylinder, a removable cylinder head closing the radially outward end of the cylinder and providing a stop for movement of the piston assembly along the cylinder, said cup-like spline providing a stop for the inward movement of the piston with respect to the cylinder, relief passages provided by the cup-like spline opening to the annular space between the spline and the cylinder, and bleed passages through the tube so disposed as to be cut off by the piston as the piston engages the head stop.

6. In a torque unit for rotating a blade in a socket, a fluid pressure actuated unit comprising a cylindrical sleeve concentric with the socket, a cup-like spline having a flange in bearing engagement with the sleeve, means for securing the spline rigidly in place, a tube mounted in the securing means and extending axially of and nearly the full length of the cylindrical sleeve, fluid passages opening through the spline, one of which openings leads to the said tube, spline teeth on the exterior of the cup-like spline member, and spline teeth of opposite inclination on the interior of the cylindrical sleeve, a piston assembly slidable over the tube and within the cylindrical sleeve and having a cylindrical skirt normally disposed between the cup-like spline and the cylindrical sleeve, said skirt having spline teeth interior thereof cooperable with the spline teeth of the spindle and spline teeth exterior thereof cooperable with the spline teeth of the cylinder, the spline teeth of the cup-like spline and the cylinder being restricted to the radially inward end half of the cylinder, a removable cylinder head closing the outward end of the cylinder and forming a stop for outward movement of the piston, removal of the cylinder head permitting movement of the piston assembly to a point within the cylinder that disengagement of the spline teeth ensues and rotation of the piston within the cylinder and relative to the cup-like spline is possible without withdrawing the piston from the cylinder, said cup-like spline providing a stop for the inward movement of the piston with respect to the cylinder, relief passages provided by the cup-like spline opening to the annular space between the spline and the cylinder, and bleed passages through the tube so disposed as to be cut off by the piston as the piston engages the head stop.

THOMAS B. MARTIN.
KENNETH L. BERNINGER.
JOHN F. HAINES.
JAMES R. MAY.
PHILLIP E. THEOBALD.
GARTHWOOD R. TAYLOR.
GENE T. NEUDECK.

REFERENCES CITED

The following references are of record in the file of this patent:

UNITED STATES PATENTS

| Number | Name | Date |
|---|---|---|
| 2,147,078 | Barish | Feb. 14, 1939 |
| 2,307,101 | Blanchard et al. | Jan. 5, 1943 |